| United States Patent Office | 3,453,430 |
|---|---|
| | Patented July 1, 1969 |

3,453,430
CONTROLLED DEFECT COLORATION DOSIMETER
Albert C. Muller, Yaphank, N.Y., assignor to the United States of America as represented by the United States Atomic Energy Commission
No Drawing. Filed Jan. 5, 1968, Ser. No. 695,867
Int. Cl. G01t 1/02
U.S. Cl. 250—83                          1 Claim

ABSTRACT OF THE DISCLOSURE

A low dose coloration dosimeter useful in the range up to $10^5$ rads consisting of fused quartz having radiation induced lattice defects from which the trapped charge carriers have been removed by heating. By the ionization mechanism the carriers are returned upon exposure to radiation. The number of carriers returned is measured by coloration and is an indicator of the dose of radiation received.

Background of the invention

In solid-state dosimetry systems, trapped charge carriers produced by absorbed radiation are counted as a means of measuring absorbed dose. In a luminescence system the trapped charge carriers are released by thermal treatment, and the resulting light, which is proportional to dose, is integrated. A drawback of the luminescence system is that the charge carriers are removed by counting. With coloration dosimeters, the trapped charge carriers are not released but are forced to vibrate in their traps when exposed to monochromatic light. The light energy dissipated (e.g., attenuation) in causing this vibration is proportional to absorbed dose and it may be measured easily with a spectrophotometer, in which monochromatic light at the peak of the material's optical absorption band is passed through the material. The attenuation of the light passing through the material indicates simple and directly the total radiation dose received. An advantage of this system is that the information remains stored after counting as the carriers are not removed during counting as in the luminescence system.

The sites of the trapped charge carriers are known as color centers, which are defects in the structure of the material. By charge carriers is meant either electrons or holes depending on the type of lattice defects or color centers. One example of a color center is the well known F-center which occurs among alkali-halide crystals. The F-center consists of a negative ion vacancy that regains electronic equilibrium with its neighbors by trapping an electron. A fuller technical description of color centers such as the F centers is found in "Color Centers in Alkali Halide Crystals" by F. Seitz, appearing in "Reviews of Modern Physics," January 1954.

A lattice defect capable of acting as a color center is a non-equilibrium condition so that it does not normally occur in significant quantities. Thus, a concentration of lattice defects (i.e., color centers), if wanted, must be produced artifically. At the present time, this has been accomplished for coloration dosimeters by introducing impurities or doping agents during crystal growth, as described in U.S. Patent 2,673,934.

Solid-state dosimeters of the coloration type are additionally very useful because of their simplicity, ruggedness and their non-dependency on elaborate instrumentation to make the readings. For example, one of the applications which are appropriate for dosimeters of this type is that of monitoring the gamma radiation delivered to granular material in a grain irradiator, where as would be expected in a food irradiation treatment, it is desirable and necessary to monitor with great accuracy the doses received by the grain. A small dosimeter, slightly larger than the grain particles themselves, is mixed in with grain in the inlet hopper and then screened out below. The regular use of such dosimeters makes it possible, provided the dosimeter itself is reliable, sensitive, and easy to use, to monitor efficiently the irradiation of food grains.

While coloration dosimeters prepared in this manner have proven to be very useful, severe limitations in their use do exist. It has been found that the doping agents produce undesirable side effects relating to calibration inconsistencies and bleaching problems. For example, a typical dosimeter in use in glass containing about 1% cobalt. This dosimeter is highly energy dependent. That is, as gamma energies undergoing measurement approach low energy levels, the readings depart by an order of magnitude of 7 to 14 times that which would be expected for the particular energies involved. In other words, a nonlinear relationship develops which results in sharp decreases in sensitivity with the resultant calibration problems. It is generally believed that this undesirable condition exists because of the high average atomic number (i.e., Z) caused by the presence of the doping agent.

Summary of the invention

The invention described herein was made in the course of, or under a contract with the United States Atomic Energy Commission.

The present invention relates to low Z solid state radiation dosimeters of the coloration type useful in the range up to $10^5$ rads in which color centers are established without the use of doping agents to produce the lattice defects.

It has been found that the disadvantages associated with doped dosimeters of the type described herein can be overcome or avoided by subjecting certain materials to substantial doses of gamma rays for sensitizing them to radiation coloring.

By way of a theoretical explanation, it is known that the energy required to displace a single atom from its normal or equilibrium lattice position is high, the threshold energy in most quartz materials, for example, being approximately 300 kev. In addition, as the cross-section to gamma photons is low, a dose of about $10^8$ rads is required to produce a significant number of such defects.

Once a lattice defect has been produced, however, an energy of only a few electron volts is required to fill it with the charge carrier of the correct polarity. Because of this low activation energy, all of the lattice defects produced with a dose of $10^8$ rads can be converted to color centers with a further dose of only about $10^5$ rads, and conversely, consistent with the low activation energy, the energy required then to remove a charge carrier from a defect is far less than that required to destroy the defect itself. For example, electrons in color centers can usually be removed at temperatures in the range of 200–300° C.

Hence, after the lattice defects are produced by large doses of gamma energy, the sample is prepared for dosimeter use by removing the trapped charge carriers by heating or annealing at temperatures far less than is required to destroy the defects. The charge carriers are readily returned to the lattice defects (producing the desired color centers) by the application of relatively small amounts of radiation to be measured. As there is a direct proportionality between dose of radiation received and the number of color centers established, as determined in the spectrophotometer, the latter gives a direct indication of the radiation dose received.

It is thus a principal object of this invention to produce a coloration dosimeter which is sensitive to and accurate in measuring lower doses of radiation than heretofore thought to be possible.

Other objects and advantages of this invention will hereinafter be readily apparent from the following description of preferred embodiments of this invention.

Description of the preferred embodiments

In accordance with this invention, commercially available fused quartz containing less than 1% by weight of impurities of the type that form color centers in the visible region is treated to produce a coloration dosimeter. In this application, by fused quartz is meant transparent crystalline, noncrystalline or semicrystalline quartz ($SiO_2$) which may be found in nature or prepared. The fused quartz, which can be of any convenient size or shape, is exposed to a dose of gamma radiation of sufficient energy to produce defects in the lattice structure but not in excess of a value where other types of damage can be produced. This range of gamma energy levels is known to be within the Compton range, which is related to a range of energies in which the Compton effect occurs or is observed. For quartz, the minimum or threshold gamma energy level is about 200–300 kev.

The size of the gamma energy dose received by the quartz is related to the gamma photon absorption cross section of the material, and the number of color centers to be established. It has been found for fused quartz that the range is about $10^7$ to $10^9$ rads of gamma rays in the proper energy level described above.

As a source for the gamma rays, any isotope emitting gamma rays within the previously specified gamma energy level range is adequate, such as a cobalt-60 and cesium-137. The examples carried out which illustrate this invention used cobalt-60 as the source of the gamma rays.

After the quartz is exposed to the proper dose of gamma rays to produce the desired lattice defects, the charge carriers trapped in the defects are stripped away by heating or annealing the quartz at a temperature sufficient to remove them but not high enough to otherwise affect or alter the lattice defects. For fused quartz, it has been found that a temperature in the range of 200° C. to 500° C. for a period from one to about 24 hours will accomplish this result. The point at which all the trapped carriers have been removed may be readily determined by examining the quartz in a spectrophotometer for thermal bleaching, that is, where further heating does not produce further attenuation of the monochromatic light beamed through the material.

Examples of dosimeters prepared in accordance with this invention follow: The starting materials were all commercially available fused quartz with impurities less than 1% of the type that form color centers.

A solid body of fused quartz having the dimension of 1 cm. x 2 cm. x 1 mm. was irradiated with a $^{60}Co$ gamma dose of $1 \times 10^9$ rads. She sample was then annealed at 400° C., and reirradiated for testing with a series of $1 \times 10^4$ rad doses. The results showed that the absorbance of the sample increased sharply at a linear rate up to a total dose of $2 \times 10^5$ rads. In an untreated sample, tested for comparison, absorbance increased only slightly over this same range. This indicated that a sample with radiation induced lattice defects in accordance with this invention was highly sensitive to and proportional to radiation within the range tested as compared to the untreated sample which showed a slight sensitivity.

A different sample of quartz obtained commercially from another source, was treated identically to that of the first sample. After initial dosage and annealing, this material exhibited a linear sensitive response terminating at 50 kilorads. The slope of absorbance vs. dose curve was far greater than that which was found for an untreated sample of the same quartz.

Other tests with a variety of commercially available quartz samples demonstrated that a dosimeter prepared in accordance with this invention was an excellent low-dose and low Z integrating device which is easy and convenient to use, as well as accurate and sensitive in the ranges employed.

While only preferred embodiments of this invention have been described, it is understood that many variations thereof are possible without departing from the principles of this invention. For example, other materials such as certain alkali halides, i.e., sodium chloride and potassium chloride, may be useful to carry out this invention, with appropriate adjustment in sensitizing irradiation levels and annealing temperatures to meet the characteristics of the materials. Hence the invention is not to be limited by the examples given but is to be defined only by the scope of the appended claim.

I claim:

1. A low Z coloration radiation dosimeter highly sensitive and linear in the range up to $10^5$ rads, comprising a body of undoped fused quartz containing less than 1% by weight of impurities that form color centers in the visible region having a controlled concentration of radiation produced lattice defects sensitive to ionizing radiation.

References Cited

UNITED STATES PATENTS 2,673,934   3/1954   Friedman.
3,012,142   12/1961  Etzel.

RALPH G. NILSON, *Primary Examiner.*

M. J. FROME, *Assistant Examiner.*

U.S. Cl. X.R.

260—570.5; 424—330